Jan. 30, 1940.　　　G. W. LEIGHTON　　　2,188,511
GRADING SCALE
Filed Oct. 15, 1937
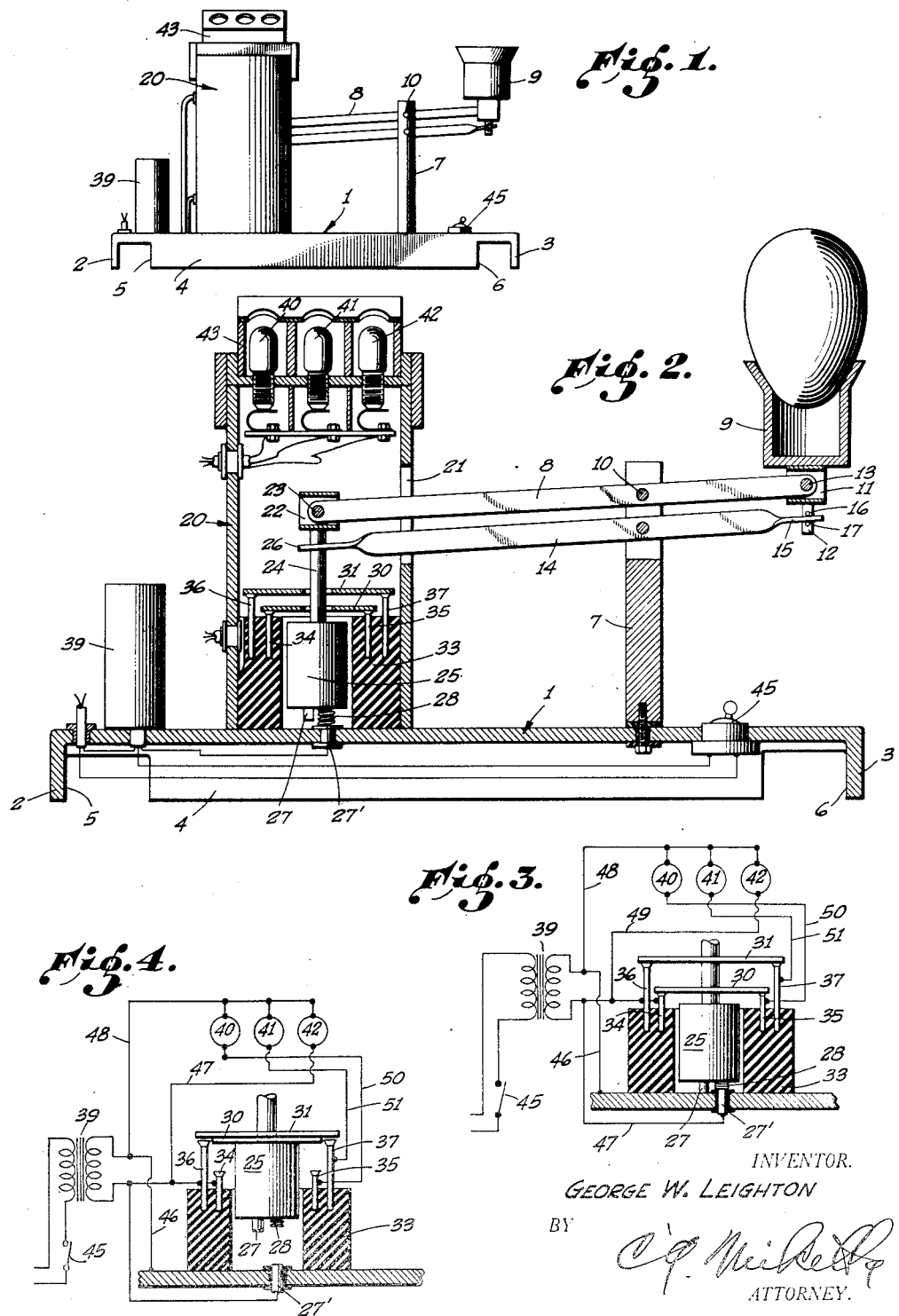
INVENTOR.
GEORGE W. LEIGHTON
BY
ATTORNEY.

Patented Jan. 30, 1940

2,188,511

UNITED STATES PATENT OFFICE 2,188,511

GRADING SCALE

George W. Leighton, Los Angeles, Calif.

Application October 15, 1937, Serial No. 169,154

5 Claims. (Cl. 177—311)

This invention relates to improvements in grading scales whereby objects differing in weight may be segregated and graded rapidly even though the actual differences in weight between the objects being thus graded are but slight. The invention is particularly directed to a device adapted to grade eggs in accordance with the weight of the egg. The differences in weights of eggs are but slight. For example, eggs weighing less than 1.25 ounces are generally termed "peewees" whereas eggs weighing from between 1.25 and 1.58 are termed "small", those weighing between 1.58 and 1.83 are termed "medium" and those weighing more than 1.83 are termed "large." A device constructed in accordance with this invention permits an operator to grade eggs with great rapidity and visual signalling means are provided whereby the particular classification into which an egg falls is immediately indicated.

Generally stated, the device of this invention comprises a lever arm or beam suitably pivoted upon a base, such lever arm having a receptacle at one end thereof adapted to receive the object, for example an egg, which it is desired to grade. The other end of the lever or beam arm passes into a housing and is movable therein. The movable end of the lever arm carries a predetermined weighted member. The base upon which the device is mounted is adapted to be supported on any flat surface or, if desired, upon the edges of an egg crate. Electrical signalling means are also carried by the housing and such electrical signalling means are actuated by the movement of the beam arm under the influence of the object being graded. Suitable counterweights are positioned above the weighted member within the housing and such counterweights make and break contacts for the signal circuit. The signal circuit is actuated by the breaking of the contacts whenever the counterweights are lifted from suitable contact pins by the weighted member carried by one end of the beam arm. In view of the fact that the signalling circuit is actuated whenever the circuit is broken, friction losses are reduced to a minimum and more positive and accurate results are attained.

It is an object of the present invention, therefore, to provide a grading device whereby minor differences in the weight of objects may be quickly and readily determined.

A further object is to disclose and provide an improved construction of an egg grader.

A still further object is to provide an egg grader including a signalling circuit which is actuated by the breaking of contacts.

These and other objects, advantages, uses and adaptations of the invention will become apparent from the detailed description given hereinabove. For purposes of illustration, reference will be had to the appended drawing, in which:

Fig. 1 is a side elevation of the entire device.

Fig. 2 is an enlarged vertical section of the device.

Fig. 3 is a wiring diagram showing certain of the elements of the device when at rest.

Fig. 4 is a wiring diagram of the device with certain of the elements in grading position.

By referring to Figs. 1 and 2, it will be seen that the device includes a base 1 which may be provided with downwardly extending end portions 2 and 3 and side portions 4. The ends 2 and 3 are spaced from the sides so as to leave transversely extending openings 5 and 6 adapted to grasp the edges of an egg crate, these two openings being spaced a distance approximating the width of an egg crate. A post 7 carried by the base 1 pivotally supports the weighing beam or lever arm 8, such arm carrying a suitable receptacle or pan 9 at one end thereof. The balance beam 8 may be pivotally connected to the post 7 as indicated at 10. The post 7 is preferably insulated from the base 1.

The receptacle 9 may carry a yoke 11 provided with a downwardly extending stem 12. The beam 8 is pivotally connected to the yoke as indicated at 13. A guide beam 14 also pivotally connected to the post 7 may be provided with an end portion 15 slidably fitting between pins 16 and 17 extending from the stem 12, such guide arm thereby maintaining the container or receptacle 9 in the vertical plane.

The base 1 also carries a housing 20 provided with a vertical slot or bore 21 through which the beam or lever arm 8 and the guide arm 14 may extend. Suitably connected to the end of the beam 8 as, for example by means of a yoke 22, pivotal bearing 23 and a stem 24, is a weighted member 25. The end of the guide arm 14 may be provided with a bifurcated end portion 26 in slidable engagement with the stem 24. The weighted member 25 is provided with a contact pin 27 adapted to rest against the base 1. Immediately beneath the weighted member 25 is a contact 27' insulated from the base 1 and a light spring 28 may be attached to the bottom of the weighted member 25 for the purpose of making contact with the contact 27' when the device is at rest. The weighted member 25 is preferably of metal so as to close a circuit between the contact 27' and the base 1 when the device is at rest.

One or more counterweights or grading weights are suitably positioned within the housing 20 immediately above the weighted member 25. In the drawing, two such counterweights are supported in spaced relation upon suitable contact pins adjustably fixed in a block of insulating material 33. By referring to Fig. 2, it will be seen that the counterweight 30 is supported by the pins 34 and 35 whereas the counterweight 31 rests upon the contact pins 36 and 37. The top of the housing 20 may carry light sources 40, 41 and 42 within a suitable housing 43 provided with windows, said windows being desirably of different colors to facilitate the interpretation of the signal circuit.

A transformer 39 may be suitably mounted upon the base 1 and such base may also include a simple switch 45.

By now referring to Fig. 3 it will be seen that when the device is at rest, the weighted member 25 will short circuit the output of the transformer 39 through the line 46, base 1, pin 27, weighted member 25, spring 28, contact 27' and line 47 which leads to the opposite terminal of the transformer 39. This short circuit will exist even though the main switch 45 is closed. The light sources 40, 41 and 42 are connected by means of line 48 with the transformer. One of said light sources, such as 42, may be connected as by line 49 with the opposite terminal of the transformer. Contact pins 34 and 36 may be permanently connected to the transformer 39, the circuit being then closed between supporting pin 34 and supporting pin 35 by means of the counterweight 30. Contact pin 35 is then connected by line 50 to light source 40. Light source 41 is connected by line 51 to the supporting pin 37 and the circuit is completed with supporting pin 36 by the counterweight 31.

In the condition of the circuit illustrated in Fig. 3, the light sources 40, 41 and 42 will not be energized even though the circuits are closed by the counterweights 30 and 31 by reason of the fact that the output of the transformer 39 is short circuited by the weighted member 25 as previously stated. When, however, a very light object such as, for example, a small egg, is placed in the receptacle 9, the weighted member 35 will be raised into the position shown in Fig. 2 and the short circuit is thus broken. This short circuit is broken before any of the counterweights 30 or 31 are lifted, however, so that in the position shown in Fig. 2 all three of the light sources 40, 41 and 42 will be energized and illuminated. If the egg placed within the receptacle 9 is a large egg, then the circuit will be broken in the manner illustrated in Fig. 4. It will be seen there that the weighted member has lifted the counterweights 30 and 31 from their contact pins, thereby breaking the circuits to the light sources 40 and 41 so that only the light source 42 is energized and illuminated, this visually indicating to the operator that the egg is a large egg and weighs more than 1.83 ounces (in accordance with the scale given hereinabove).

It will be evident to those skilled in the art that at positions intermedaite the showings of Figs. 2 and 4 the counterweight 30 may be raised and the circuit broken to light source 40 without breaking the circuit to light sources 41 and 42 so that when the signalling circuit shows that only light sources 41 and 42 are energized, the egg being graded is of medium size. Obviously, if a peewee egg were to be placed in the container 9, the counterweight 25 would not be lifted and the egg would be immediately classed as a peewee since none of the light sources would be energized.

Any desired number of counterweights may be employed. Preferably the counterweights are made of metal capable of closing the circuit between the supporting pins. It has been found desirable to use three pins to support each of the counterweights. Although particular reference has been made to an egg grader, it will be evident to those skilled in the art that the receptacle or container 9 may be made so as to obtain a unit volume of powdered or liquid materials so that the weight per cubic foot or specific gravity of materials, within ranges used by the counterweights, can be readily determined.

I claim:

1. In a visually indicating grading device for objects differing in weight, the combination of: a base, a lever arm having an object-receiving receptacle at one end and a weighted member at the other, said lever arm being pivotally carried by said base whereby said weighted member may be moved vertically; a housing carried by said base, said housing having a port therein adapted to receive one end of said lever arm and to enclose the weighted member carried thereby; a metallic counterweight above said weighted member within said housing; contact pins supporting said counterweight out of contact with said weighted member; a contact in said base but insulated therefrom and positioned below said weighted member; and a signalling circuit including a light source, two terminals adapted to be connected to a source of electrical energy, an electrical connection between one terminal and said base and the light source, another connection between the other terminal and said base contact, a connection between said last named terminal and a supporting contact pin, and an electrical connection between another contact pin and the light source, said weighted member being adapted to close a circuit between the base and base contact and thus short-circuit the supply of energy to the light source when said weighted member is in its lowermost position, said weighted member being adapted to first break the said short and then to lift the counterweight and break the circuit to the light source when said weighted member is moved upwardly.

2. In a device of the character described, the combination of a weighing beam, a weighted member carried by one end thereof and movable vertically, a series of horizontally spaced grading weights supported above said weighted member in vertically spaced relation thereto, contact pins for supporting each of said grading weights, and a signalling circuit including a light source connected to a contact pin supporting each of the series of grading weights, and a source of electrical energy connected to another contact pin supporting each of the series of grading weights, said weighted member being movable vertically to serially lift said grading weights and serially break the signalling circuit to the light sources.

3. In a device of the character described, the combination of a base, a lever arm having an object-receiving receptacle at one end and a weighted member at the other, said lever arm being pivotally carried by said base; a housing carried by said base, said housing having a port therein adapted to receive one end of said lever arm and to enclose the weighted member carried thereby; an insulated annular supporting block in said housing and around said weighted member; two sets of concentrically arranged adjustably positionable contact pins carried by said block, a metallic grading weight supported by each set of contact pins, said grading weights being vertically spaced from each other and from the weighted member, said grading weights being adapted to be lifted from their supporting contact pins by upward movement of said weighted member; a contact in said base but insulated therefrom and positioned below said weighted member; and a signalling circuit including a light source connected to a contact pin supporting each of said grading weights, a source of electrical energy connected to another contact pin supporting each of said grading weights, and to said base contact, whereby said light sources are short circuited by said weighted member when the latter is at rest and bridges the base and base contact, said light sources are energized when the weighted member opens said short circuit, and the light sources are serially deenergized as the corresponding grading weights are lifted from the supporting pins by the weighted member.

4. In a grading device, a base provided with downwardly directed end portions adapted to fit over the edges of a crate, a weighing beam pivotally carried by said base, a weighted member carried by one end of said beam and movable vertically, a series of horizontally spaced grading weights supported above said weighted member in vertically spaced relation thereto, contact pins for supporting each of said grading weights, and a signalling circuit including a light source connected to a contact pin supporting each of the series of grading weights, and a source of electrical energy connected to another contact pin supporting each of the series of grading weights, said weighted member being movable vertically to serially lift said grading weights and serially break the signalling circuit to the light sources.

5. In a visually indicating grading device for objects differing in weight, the combination of: a base, a lever arm pivotally supported on said base, a weighted member carried by one end of said arm, a contact in said base but insulated therefrom and positioned below said weighted member, a contact pin in the bottom of said member adapted to contact said base, a spring contact carried by the bottom of the member and adapted to contact said base contact, and a signalling circuit including a source of electrical energy, a light source connected thereto and a shorting circuit including electrical connections between said source of energy, base and base contact, said signalling circuit being shorted when the weighted member is in contact with the base and base contact.

GEORGE W. LEIGHTON